United States Patent [19]

Blount

[11] 4,346,214
[45] Aug. 24, 1982

[54] PROCESS FOR THE PRODUCTION OF POLYESTER AMIDE SILICATE RESINOUS PRODUCTS

[76] Inventor: David H. Blount, 5450 Lea St., San Diego, Calif. 92105

[21] Appl. No.: 297,715

[22] Filed: Aug. 31, 1981

Related U.S. Application Data

[63] Continuation-in-part of Ser. No. 124,093, Feb. 25, 1980, which is a continuation-in-part of Ser. No. 10,061, Feb. 7, 1979, Pat. No. 4,200,697, which is a continuation-in-part of Ser. No. 794,915, May 9, 1977, Pat. No. 4,125,498, which is a continuation-in-part of Ser. No. 653,727, Jan. 30, 1976, abandoned, which is a continuation-in-part of Ser. No. 562,201, Apr. 14, 1975, abandoned.

[51] Int. Cl.³ .................. C08G 63/04; C08G 63/30

[52] U.S. Cl. ........................... 528/275; 521/91; 521/122; 521/154; 521/184; 521/137; 521/138; 525/425; 525/426; 525/431; 528/288; 528/295.5

[58] Field of Search .............. 528/288, 295.5, 275; 525/426, 431, 425

[56] References Cited

U.S. PATENT DOCUMENTS

| | | | |
|---|---|---|---|
| 4,200,697 | 4/1980 | Blount | 521/122 |
| 4,211,848 | 7/1980 | Blount | 260/185 |

*Primary Examiner*—Morton Foelak

[57] ABSTRACT

Polyester amide silicate resinous products are produced by heating a mixture of an oxidated silicon compound, polyhydroxy compound, a polycarboxylic acid and/or polycarboxylic acid anhydride and a polyamine in the presence of an alkali catalyst.

10 Claims, No Drawings

PROCESS FOR THE PRODUCTION OF POLYESTER AMIDE SILICATE RESINOUS PRODUCTS

CROSS-REFERENCE TO RELATED TO CO-PENDING APPLICATIONS

This application is a continuation-in-part of U.S. patent application, Ser. No. 124,093, filed on Feb. 25, 1980, which is a continuation-in-part of U.S. patent application, Ser. No. 10,061, filed Feb. 7, 1979, now U.S. Pat. No. 4,200,697 which is a continuation-in-part of U.S. patent application, Ser. No. 794,915, filed on May 9, 1977, now U.S. Pat. No. 4,125,498, which is a continuation-in-part of U.S. patent application, Ser. No. 653,727, filed on Jan. 30, 1976, now abandoned, which was a continuation-in-part of U.S. patent application, Ser. No. 562,201, filed on Apr. 14, 1975, now abandoned.

BACKGROUND OF THE INVENTION

This invention relates to a process for the production of polyester amide silicate resinous products by chemically reacting an oxidated silicon compound, polyhydroxy organic compound, a polycarboxylic acid and/or a polycarboxylic acid anhydride and a polyamine in the presence of an alkali catalyst.

For the purpose of this invention, the product produced by the process of this invention will be named polyester amide silicate.

The oxidated silicon compound will react chemically with the polyhydroxyl compounds, polycarboxylic acid, polycarboxylic acid anhydrides and polyamines.

The polyester amide silicate resinous product may be utilized as a molding powder and may be molded into useful objects by heat and pressure such as gears, knobs, handles, fibers, art objects, or may be utilized as solvents, as coating agents for wood, metal, linoleum, leather, fabrics and rubber. They may be utilized in paints, lacquers, metal primers, caulking compounds, water-emulsion paints, as adhesives and as impregnants. They may be copolymerized with vinyl monomer when unsaturated carboxylic acids or polyhydric alcohols are used, producing hard, solid, useful objects, or may be used in conjunction with a reinforcing filler such as glass fibers, paper or cloth to produce a laminate of outstanding strength and durability. They may be chemically reacted with polyisocyanates to produce polyurethane silicate resinous and foamed products which may be used for thermal and sound insulation in homes, commercial buildings, airplanes, automobiles, home appliances, in packaging and in building components. They are soluble in solvents and may be used as adhesives and coating agents for wood, metal and plastics. They may also be used as catalysts for polyisocyanates.

Polyester amide silicate resinous products are produced by reacting the following components:
(a) an oxidated silicate compound;
(b) a polyhydroxyl organic compound;
(c) a polycarboxylic acid and/or a polycarboxylic acid anhydride;
(d) a polyamine;
(e) an alkali catalyst.

Component (a)

Any suitable oxidated silicon compound may be used in this invention such as hydrated silica, e.g., silicic acid, silicic acid gel, silica sol, silicoformic acid, polysilicoformic acid, natural silicates containing free silicic acid, radicals and mixtures thereof.

Hydrated silica is the preferred oxidated silicon compound.

Component (b)

Suitable polyhydric alcohols include, but are not limited to, ethylene glycol; propylene-1,2- and -1,3-glycol; butylene-1,4- and -2,3-glycol; hexane-1,6-diol; octane-1,8-diol; neopentyl glycol; cyclohexanedimethanol-(1,4-bis-hydroxymethylcyclohexane); 2-methylpropane-1,3-diol; diethylene glycol; triethylene glycol; tetraethylene glycol; polyethylene glycols; dipropylene glycol; polypropylene glycols; dibutylene glycol and polybutylene glycols. The unsaturated polyester resins may contain lactones such as $\epsilon$-caprolactone, or hydrocarboxylic acids such as $\omega$-hydroxy-caproic acid. Polyethers containing 2 hydroxyl groups may be used in production of unsaturated polyester resins and may be prepared, e.g., by the polymerization of epoxides, e.g., ethylene oxide, propylene oxide, butylene oxide, tetrahydrofuran, styrene oxide or epichlorohydrin, each with itself, e.g., in the presence of $BF_3$, or by addition of these epoxides, optionally as mixtures or successively, to starting components such as alcohols or amines, e.g., water; ethylene glycol; propylene-1,3- or -1,2-glycol; trimethylol propane; 4,4'-dihydroxydiphenylpropane; aniline; ammonia; ethanolamine or ethylenediamine. The polyethers may be modified with vinyl polymers such as those which may be obtained by polymerizing styrene or acrylonitrile in the presence of polyethers.

Suitable unsaturated alcohols such as allyl alcohol may be reacted with dibasic acids such as phthalic anhydride, succinic acid, maleic acid, maleic anhydride, itaconic acid and fumeric acid to produce allyl esters which may be polymerized alone or with other polymerizing monomers. Allyl esters such as diethylene glycol bis(allyl carbonate), diallyl maleate, diallyl fumarate, diallyl phthalate, diallyl benzene phosphonate, allyl itaconate and methallyl methacrylate may be used in this invention. Triallyl cyanurate may be reacted with unsaturated polyester amide resins to produce resins, and may be used as the polymerizing monomer. Up to 50% by weight of the polycarboxylic acid and/or polycarboxylic acid anhydride may be replaced with a linear organic cardonate or organic compounds containing hydroxyl and carboxyl radicals.

Other unsaturated alcohols may be reacted with dibasic acids; these include other polymeric allyl-type alcohols which are alcohols having a double bond or aliphatic character between two carbon atoms, one of which is attached directly to a saturated carbon atom, which, in turn, is attached directly to an alcoholic hydroxyl group, as represented by the general structural formula:

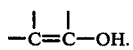

Alcohols embodying this structure may properly be termed "beta, gamma-olefinic monohydric alcohols". Allyl-type alcohols having a terminal methylene group attached by an olefinic double bond to a carbon atom which is attached directly to a saturated carbinol carbon are represented by the formula:

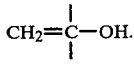

Up to 50% by weight of the polyhydroxy compound may be replaced with a compound containing polyhydroxy and carboxyl radicals.

Component (c)

The polycarboxylic acid may be aliphatic, cycloaliphatic, aromatic and/or heterocyclic and may be substituted, e.g., with halogen atoms and may be unsaturated; examples include: succinic acid, adipic acid, sebacic acid, subaric acid, azelaic acid, phthalic acid, phthalic acid anhydride, isophthalic acid, tetrahydrophthalic acid anhydride, trimallitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterephthalate and bis-glycol terephthalate.

Long-chain unsaturated polyester amide silicate resins may be made from dibasic acids and dihydric alcohols. Either the dibasic acid or the dihydric alcohol may be unsaturated. Usually a combination of unsaturated and saturated dibasic acids and dihydric alcohols is used to produce the unsaturated polyester resins. Instead of the dibasic acids, the corresponding polycarboxylic acids esters of lower alcohols or their mixtures may be used for preparing the unsaturated polyester resins.

Suitable dibasic acids may be aliphatic, cycloaliphatic, aromatic and/or heterocyclic and may be substituted, e.g., with halogen atoms. Examples of the dibasic acid and corresponding acid anhydride include, but are not limited to, succinic acid, adipic acid, suberic acid, azelaic acid, phthalic acid, sebasic acid, isophthalic acid, trimellitic acid, phthalic acid anhydride, tetrahydrophthalic acid anhydride, hexahydrophthalic acid anhydride, endomethylene tetrahydrophthalic acid anhydride, glutaric acid anhydride, maleic acid, maleic acid anhydride, fumaric acid, dimeric and trimeric fatty acids such as oleic acid, optionally mixed with monomeric fatty acids, dimethylterephthalate and bisglycol terephthalate. An unsaturated dibasic acid such as maleic acid, maleic acid anhydride, fumaric acid, itaconic acid or mixtures thereof must be included in the production of unsaturated polyester amide silicate resins, except when an unsaturated alcohol is used.

The polyester resins may be modified with polyacetals, polyester amides, polyamides, organic diisocyanates, natural polyols, e.g., castor oil and additional products of alkylene oxides with phenoformaldehyde resins or with urea-formaldehyde resins.

The saturated polyester resins may be modified by polymerable oils such as unsaturated fatty acids (or their esters), tung oil, linseed oil, heated linseed oil, soya bean oil, dehydrated castor oil, tall oil, cottonseed oil, sunflower oil, fish oil, perilla oil and safflower oil. Up to 50% by weight of the polycarboxylic acid and/or polycarboxylic acid anhydride may be replaced with a polymerable oil.

Any suitable polymerizing monomer may be used with the unsaturated polyester amide resin such as, but not limited to, vinyl monomers, allyl esters, triallyl cyanurate and mixtures thereof.

Styrene is the preferred polymerizing monomer and may be used alone or in combination with vinyl acetate. Other vinyl monomers may be used such as acrylic acid compounds and esters, vinyl toluene, divinyl benzene, acrylonitrile, methacrylonitrile, etc.

Activators and promoters, used in conjunction with the initiators such as cobalt which, in the form of its ethyl hexanoate or naphthanate salt, is a good, general-purpose activator for use with ketone peroxides, may be added to the unsaturated polyester resin. Concentration as low as 30 ppm of cobalt metal will activate a system. Other activators may be added to the unsaturated polyester resins such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

An inhibitor, such as p-tert-butyl catechol, hydroquinone, p-nitrose dimethylaniline or similar compounds, which will increase the lifetime of the unsaturated polyester resin, may be added to the unsaturated polyester resin.

Any suitable initiator which will promote the copolymerization of a solution of an unsaturated linear polymer in a liquid monomer may be used in this invention. The controlled polymerization of unsaturated polyester-monomer mixture, in order to yield fully cured solids, usually requires the use of an initiator.

Any suitable free-radical initiator, such as organic and inorganic peroxides, azo compounds, alkali metal persulfates, ammonium persulfate and mixtures thereof, may be used. The fact that the action of organic peroxide can be modified by activators and promoters, plus their ready availability at reasonable cost, makes them preferable in this invention. Thermal and photopolymerization may be used in certain cases.

Suitable organic peroxide initiators include, but are not limited to, acetyl benzoyl peroxide, peracetic acid, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauroyl peroxide, benzoyl peroxide, tert-butyl perbenzoate, di-tert-butyl diperphthalate, and mixtures thereof.

Promoters used with acryl peroxide include tertiary dialkyl aryl amines, such as diethyl aniline, and aliphatic thiols, as, for example, lauryl mercaptan. Concentration used are most often in the range of 0.05% to 0.5% of active substance. Promoters usually are strong reducing agents and initiators are strong oxidizing agents.

Suitable alkali metal persulfates include potassium and sodium persulfate. Redox systems may also be utilized in this invention.

Component (d)

The polyamines to be used in this invention include those organic materials possessing a plurality of amino hydrogen, i.e., a plurality of:

groups wherein N is an amino nitrogen. These include the aliphatic, cycloaliphatic, aromatic or heterocyclic polyamines as well as derivatives thereof as long as the derivations still contain the necessary amino hydrogen.

Suitable examples of these materials include, among others, the aliphatic polyamines such as, for example, ethylenediamine, diethylenetriamine, triethylenetetramine, tetraethylenepentamine, 1,4-diaminobutane; 1,3-diaminobutane; hexamethylenediamine; 3-(N-isopropylamine)propylamine; N,N'-diethyl-1,3-propanediamine; hexapropyleneheptamine; penta(1-methyl-propylene) hexamine; tri(1,2,2-trimethylethylene) tetramine; tetra(1,3-dimethylpropylene) pentamine; penta(1,5-dimethylamylene) hexamine; penta(1,2-dimethyl-1-isopropylethylene) hexamine and N,N'-dibutyl-1,6-hexanediamine.

Suitable aliphatic polyamines are the alkylene polyamines of the formula:

NH$_2$(RNH)$_n$H wherein R is an alkylene radical or a hydrogen-substituted alkylene radical, and n is an integer of at least one, there being no upper limit to the number of alkylene groups in the molecule.

The aliphatic polyamines are preferred which comprise the polyethylene polyamines of the formula:

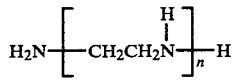

wherein n is an integer verying from about 2 to 8. A mixture of high molecular weight polyethylene polyamines and diethylenetriamine is especially preferred.

Suitable polyamines include polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming or copolymers having groups reactive with amines such as, for example, aldehyde groups, as present on acrolein and methacrolein polymers, and reacting these materials with monomeric amines to form the new polymeric polyamines. Polymeric amines can also be formed by preparing polymers containing ester groups, such as, for example, a copolymer of octadecene-1 and methylacrylate, and then reacting this with a polyamine so as to effect an exchange of an ester group for an amide group and leave the other amine group or groups free. Polymers of this type are described in U.S. Pat. No. 2,912,416.

Suitable polyamines include the polyamines possessing cycloaliphatic ring or rings, such as, for example:

1-cyclohexylamino-3-aminopropane,
1,4-diaminocyclohexane,
1,3-diaminocyclopentane,
di(aminocyclohexyl) methane,
di(aminocyclohexyl) sulfone,
1,3-di(aminocyclohexyl) propane,
2,4-diaminocyclohexane,
N,N'-diethyl-1,4-diaminocyclohexane, and the like.

Preferred members of this group comprise these polyamines having at least one amino- or alkyl-substituted amino group attached directly to a cycloaliphatic ring containing 5 to 7 carbon atoms.

Other suitable polyamines comprise the aminoalkyl-substituted aromatic compounds such as, for example, di(aminoethyl) benzene, di(aminomethyl) benzene, tri(aminoethyl) benzene, tri(aminobutyl) naphthalene and the like.

Suitable polyamines also include the organo-metallic compounds, such as those having a silicon or boron atom or atoms linked to amino or substituted amino groups. The compounds may also be those organo-metallic compounds wherein the amino group or substituted amino group or groups are attached to carbon, such as in the alkosilylpropylamines like triethoxysilylpropylamines.

Other suitable polyamines include the N-(aminoalkyl) piperazines, such as, for example, N-aminobutylpiperazine, N-aminoisopropyl-3-butoxypiperazine, N-aminoethylpiperazine, 2,5-dibutyl-N-aminoethylpiperazine, 2,5-dioctyl-N-aminoisobutylpiperazine and the like.

Another group of suitable materials is obtained by reacting the above-described polyamines with a monoepoxide. Examples of these reactants include, among others, ethylene oxide, propylene oxide, styrene oxide, phenyl glycidyl ether, silyl glycidyl ether, octadecyl glycidyl ether, tolyl glycidal ether, chlorophenyl glycidyl ether, naphthyl glycidyl ether, diacetate of monoglycidyl ether of glycerol, dipropionate of the monoglycidyl ether of glycerol, epichlorohydrin, 1,2-dicylene oxide, glycidyl acetate, glycidyl propionate, glycidyl acrylate, glycidyl methyl maleate, glycidyl stearate, glycidyl oleate, butyl 1,2-epoxypropionate and the like. This reaction between polyamines and monoepoxide is effected merely by bringing the components together in proper proportion. The adducts are obtained when a mol of the polyamine is reacted with not more than one mol of monoepoxide. The excess amine can be retained or can be removed by distillation. Examples of the monoepoxidepolyamine reaction products include, among others, N(hydroxypropyl) diethylenetriamine (reaction product of propylene oxide and diethylenetriamine) and N(2-hydroxy-3-phenoxypropyl)diethylenetriamine (reaction product of phenyl glycidyl ether and diethylenetriamine).

A group of related materials are those soluble fusible products obtained by reacting a polyepoxide with a monoamine. Examples of polyepoxides that may be used include any of the present invention. Examples of the monoamines include any of those noted above for use in the compositions of the present invention. Examples of the monoamines include, among others, secondary amines sicj as dimethylamine, dipropylamine, dibutylamine, di(tert-butyl) amine, dinonylamine, dicyclohexylamine, diallylamine, dibenzylamine, methylethylamine, ethylcyclohexylamine, and the like. This reaction between the polyepoxides and monoamines is effected by merely bringing the components together in proper proportions. The desired soluble fusible products are obtained when the polyepoxide and monoamine are combined so as to have at least 1.5 mols of the amine per epoxide equivalent of the polyepoxide.

Other examples include the soluble reaction products of polyepoxides and polyamines and salts thereof, such as described in U.S. Pat. Nos. 2,640,037 and 2,643,239.

Still other derivatives that may be employed include those obtained by reacting the polyamines with acrylates, such as methyl acrylate, ethyl acrylate, methyl methacrylates and the like. In this case, there is an exchange of the ester linkage for an amide linkage, one of the polyamine nitrogen being involved in the said amide linkage.

Another suitable group of derivatives that may be used in the process of the invention include those soluble and fusible products obtained by reacting the polyamines noted above with unsaturated nitriles, such as acrylonitrile. Examples of such products include the cyanoethylated diethylenetriamine, cyanoethylated triethylenetetramine, cyanoethylated hexamethylenediamine, cyanoethylated 1,3-propanediamine and cyanoethylated 1,3-diaminocyclohexane. Preferred species of the cyanoalkylated polyamines include those of the formula:

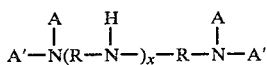

wherein x represents an integer in the range of 0 through 3 and A and A' represent a member selected from the group consisting of hydrogen and cyanoethyl radicals, and further characterized in that the amine has at least one cyanoethyl group and at least one nontertiary amino group in the molecule. The preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula:

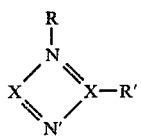

wherein X is an organic radical and, preferably, an alkylene radical, R' is a long-chain hydrocarbon radical, and, preferably, one containing at least 12 carbon atoms, and R is an organic radical containing an amine or amine-substituted group. Particularly preferred members of this group are those obtained by reacting any of the above-described polyamines with long-chain monocarboxylic acids, such as those containing at least 12 and, preferably, 16 to 39 carbon atoms, such as, for example, palmitic acid, pentadeconoic acid, 4-ketomyristic acid, 8,10-dibromostearic acid, margaric acid, stearic acid, alphachlorostearic acid, linoleic acid, oleic acid, dehydroxystearic acid, arachidic acid, behenic acid, cluopanodonic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about 0.3 to 0.7 to 1, and, preferably, about 0.3 to 0.5 to 1. The temperature employed, preferably, varies from about 100° C. to 250° C.

Suitable polyamines include the aromatic polyamines, especially those having at least two —NH$_2$ groups attached to aromatic ring or rings and containing up to 25 carbon atoms.

Suitable polyamines include the sulfur- and/or phosphorus-containing polyamines such as may be obtained by reacting a mercaptan- or phosphine-containing active hydrogen with an epoxy halide to form a halohydrin, dihydrochlorinating and then reacting the resulting compound with a polyamine. N-(3-ethylthio-2-hydropropyl)diethylenetriamine may be prepared, for example, by reacting ethyl mercaptan with epichlorohydrin, dihydrochloroinating and then reacting the resulting epoxy compound with diethylenetriamine. Suitable examples of such compounds include, among others, N-(1-butylthio-2-hydroxypropyl) triethylenetetramine,
N-(4-phenylthio-3-hydrobutyl) pentamethylenetetramine,
N-(4-cyclohexylthio-3-hydrobutyl) ethylenediamine,
N-(3-cyclohexylthio-2-hydropropyl) hexamethylenediamine,
N-(3-diphenylphosphino-2-hydroxypropyl) triethylenetetramine,
N-(3-dicyclohexylphosphino-2-hydroxypropyl) pentamethylenetetramine,
N-(3-dididecylphosphino-2-hydroxyhexyl) diethylenetriamine,
N-3-(allylthio-2-hydroxypropyl) hexamethylenediamine.

The N-(allylthio-hydroxyallyl) aliphatic and aromatic polyamines, the N-(cycloalkylthiohydroxy-alkyl) aliphatic and aromatic polyamines and the N-(arylthiohydroxyalkyl) aliphatic and aromatic polyamines may also be used in this invention. Preferred phosphorus-containing curing agents include the N-(dialkylphosphinohydroxyalkyl) aliphatic and aromatic polyamines, the N-(dicycloalkylphosphinohydroxyalkyl) aliphatic and aromatic polyamines and the N-(diarylphosphinohydroxyalkyl) aliphatic and aromatic polyamines.

Suitable polyamines include the polyamines of the formula:

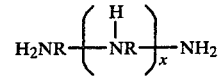

wherein x is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acid containing up to 20 carbon atoms.

Salt of polyamines and fatty acid (e.g., stearic, linoleic dicanoic acid, lauric acid, oleic acids and the like) may be used in this invention.

Component (e)

Any suitable alkali catalyst may be used such as alkali metal carbonates, e.g., sodium carbonate and potassium carbonate; alkali metal hydroxides such as sodium hydroxide and potassium hydroxide; alkali metal silicates such as sodium silicate and potassium silicate, alkaline earth metal hydroxides such as calcium hydroxide, and mixtures thereof. Sodium silicate is the preferred alkali catalyst.

The object of this invention is to produce polyester amide silicate resinous products. Another object is to produce polyester amide resinous products that may be molded under heat and pressure to produce hard, tough, useful objects. Still another object of this invention is to produce polyester amide silicate resinous products which can be further reacted with a vinyl monomer. Another object of this invention is to produce polyester amide silicate resinous products which can be reacted with polyisocyanates to produce polyurethane silicate resinous products and foams.

DETAILED DESCRIPTION OF THE INVENTION

I have discovered that an oxidated silicon compound, a polyhydric organic compound, a polycarboxylic acid and/or polycarboxylic acid anhydride, and an organic polyamine compound will react chemically to produce a polyester amide silicate resinous product.

The preferred method is to simultaneously mix Component (a), an oxidated silicon compound, Component (b), a polyhydroxyl organic compound, Component (c), a polycarboxylic acid and/or a polycarboxylic acid anhydride and Component (d), an organic polyamine compound, then to heat the mixture to a temperature between the melting temperature of the polycarboxylic acid and the boiling temperature of the polyhydroxyl organic compound or polyamine while agitating for 20 to 90 minutes, thereby producing a polyester amide silicate resinous product.

The compounds may be mixed in any suitable manner: They may be pre-reacted to produce polyamine silicates, polyhydroxy silicates, polycarboxyl silicates; or the organic compounds may be prereacted to produce liquid polyesters or polyamides, then the components may be reacted together. The alkali catalyst is not essential, but its presence does improve and speed up the chemical reactions.

The reactions of this invention may take place under any suitable physical conditions. While most of the reaction will take place at ambient pressure, in certain cases, a lower-than- or above-ambient pressure may give faster and better results. It may be preferable in certain cases to use temperatures above the polyamine's or polyol's boiling temperature after a partial reaction has taken place in order to speed up the chemical reaction. The temperature may be gradually elevated up to 250° C. and the pressure lowered to remove the water by vacuum.

The exact cause of the reactions in the production of polyester amide silicate resinous product is not known. The silicates may react with polyhydroxy compounds, polyamines, polycarboxylic acids or polycarboxylic acid anhydrides. Studies of the reaction product of glycerol and hydrated silica by using the IR method show that the glycerol has reacted with the hydrated silica. Reactions of polyamine with hydrated silica are illustrated in U.S. Pat. Nos. 4,100,112 and 4,157,438. Reactions of polyhydroxy compounds with hydrated silica are illustrated in U.S. Pat. Nos. 4,089,883; 4,139,549; 4,107,140 and 4,256,873. Reactions of polyhydroxy compounds and polycarboxylic acids with hydrated silica are illustrated in U.S. Pat. Nos. 4,125,498 and 4,200,697.

The ratio of the components which lead to the polyester amide silicate resinous product of this invention may vary, broadly speaking, within ranges as follows:

Component (a): 1 to 10 parts by weight of an oxidated silicon compound;
Component (b): 1 to 30 parts by weight of a polyhydroxyl organic compound;
Component (c): 10 to 30 parts by weight of a polycarboxylic acid and/or polycarboxylic acid anhydride;
Component (d): 1 to 30 parts by weight of an organic polyamine compound;
Component (e): Up to 10% by weight of an alkali catalyst, percentage based on the weight of Components (a), (b), (c) and (d).

DESCRIPTION OF PREFERRED EMBODIMENTS

My invention will be illustrated in greater detail by the specific examples which follow, it being understood that these preferred embodiments are illustrative of, but are not limited to, procedures which may be used in the production of polyester amide silicate resinous products. Parts and percentages are by weight unless otherwise indicated.

EXAMPLE 1

About 10 parts by weight of fine granular hydrated silica, 10 parts by weight of glycerol, 5 parts by weight of ethylenediamine, 1 part by weight of a sodium metasilicate pentahydrate and 25 parts by weight of phthalic anhydride are mixed, then gradually heated to just above the melting temperature of phthalic anhydride while agitating for 20 to 90 minutes, thereby producing a polyester amide silicate resinous product.

Other triols may be used in place of glycerol such as trimethylol propane, trimethylol ethane, butane-1,2,4-triol, hexane-1,2,6-triol, and mixtures thereof.

The polyester amide silicate resinous product is soluble in acetic acid, diethylene glycol and other organic solvents.

EXAMPLE 2

About 10 parts by weight of fine granular hydrated silica, 5 parts by weight of propylene glycol, 10 parts by weight of diethylenetriamine and 20 parts by weight of maleic acid are mixed, then heated to just above the melting point of maleic acid while agitating at ambient pressure for 20 to 90 minutes, thereby producing a polyester amide silicate resinous product.

EXAMPLE 3

About 5 parts by weight of fine granular silicic acid, 5 parts by weight of ethylene glycol, 10 parts by weight of hexamethylenediamine, 20 parts by weight of adipic acid and 0.5 part by weight of sodium hydroxide are mixed, then heated to just above the melting point of adipic acid while agitating for 20 to 90 minutes, thereby producing a polyester amide silicate resinous product.

EXAMPLE 4

5 Parts by weight of fine granular hydrated silica, 2 parts by weight of sodium silicate, 5 parts by weight of ethylene glycol, 5 parts by weight of diethylene glycol, 5 parts by weight of fumaric acid, 5 parts by weight of linseed oil, 5 parts by weight of phthalic anhydride and 5 parts by weight of propylenediamine are mixed, then heated to just above the melting point of phthalic anhydride while agitating at ambient pressure for 20 to 90 minutes, thereby producing a polyester amide silicate resinous product.

EXAMPLE 5

About 10 parts by weight of fine granular hydrated silica, 1 part by weight of sodium silicate, 5 parts by weight of glycerol, 10 parts by weight of 1,4-butanediol, 5 parts by weight of triethylenetetraamine, 10 parts by weight of phthalic anhydride and 10 parts by weight of succinic acid are mixed, then heated to just above the melting temperature of phthalic anhydride while agitating for 20 to 90 minutes, thereby producing a polyester amide silicate resinous product.

EXAMPLE 6

About 20 parts by weight of hydrated silica, 20 parts by weight of glycerol, 3 parts by weight of sodium carbonate, 20 parts by weight of phthalic anhydride and 5 parts by weight of propylenediamine are mixed, then heated to above the melting temperature of phthalic anhydride (150° C. to 250° C.) while agitating at ambient pressure for about 30 minutes. Dilute sulfuric acid is added in an amount equivalent to the amount of sodium atoms present in the mixture. The mixture is then heated at 150° C. to 250° C. while agitating for 30 to 60 minutes until the desired viscosity or hardness is obtained, thereby producing a polyeser amide silicate resinous product.

The polyester amide silicate resinous product is soluble in ethylene glycol, acetic acid, acetone and other organic solvents. It has a melting point of about 80° C., but this varies with molecular size. A solution of said polyester amide silicate resinous product was filtered and about 15 to 30% by weight of the hydrated silica was filtered out, unreacted.

The polyester amide silicate solution may be painted on wood and is a good coating agent. The resinous product may be molded into useful hard solid products by heating to above the melting point and then injecting the melted resinous product under pressure into a mold of a useful object such as knobs, handles, sheets, etc.

The foaming polyurethane silicate may be poured into molds in the shape of concrete blocks and used in construction of walls in houses or in other construction. It may be poured in molds of panels and used for sound and thermal insulation in construction.

Although specific conditions and ingredients have been described in conjunction with the above Examples of preferred embodiments, these may be varied, and other reagents and additives may be used, where suitable, as described above, with similar results.

Other modifications and applications of this invention will occur to those skilled in the art upon reading this disclosure. These are intended to be included within the scope of this invention, as defined in the appended claims.

I claim:

1. The process for the production of polyester amide silicate resinous product by the following steps:
   (a) mixing 1 to 10 parts by weight of an oxidated silicon compound, 1 to 30 parts by weight of a polyhydroxy organic compound, 10 to 30 parts by weight of a polycarboxylic acid and/or polycarboxylic acid anhydride compound, 1 to 30 parts by weight of an organic polyamine compound and up to 10% by weight of an alkali catalyst, percentage based on the weight of the reactants.
   (b) heating the said mixture at a temperature between the melting and the boiling temperatures of the polycarboxylic acid or polycarboxylic acid anhydride or polyamine compound while agitating for 20 to 90 minutes, thereby
   (c) producing a polyester amide silicate resinous product.

2. The process of claim 1 wherein the oxidated silicon compound is hydrated silica.

3. The process of claim 1 wherein the polyhydroxyl organic compound is selected from the group consisting of ethylene glycol, propylene glycol, butylene glycol, trimethylene glycol, tetramethylene glycol, polypropylene glycol, pentamethylene glycol, hexamethylene glycol, diethylene glycol, triethylene glycol, polyethylene glycol, dipropylene glycol, polybutylene glycol, bis($\beta$-hydroxyethyl) terephthalate, Bisphenol A, resorcinol, glycerol, di- and tri-pentaerythritol, trimethylol propane, glycerol monochlorohydrin, trimethylol ethane, carbohydrates, and mixtures thereof.

4. The process of claim 1 wherein the polycarboxylic acid and polycarboxylic anhydride are selected from the group consisting of maleic acid, phthalic acid, succinic acid, oxalic acid, malonic acid, glutaric acid, adipic acid, pimelic acid, suberic acid, isophthalic acid, fumaric acid, azelaic acid, sebacic acid, terephthalic acid, itaconic acid, diglycolic acid, tartaric acid, phthalic acid anhydride, maleic acid anhydride, succinic acid anhydride, glutaric acid anhydride, poly(adipic anhydride), tetrachlorophthalic acid anhydride, pyromellitic anhydride, tetrahydrophthalic anhydride, dodecenylsuccinic acid anhydride, hexadecylsuccinic anhydride, nitrophthalic acid anhydride, and mixtures thereof.

5. The process of claim 1 wherein the organic polyamine compound is selected from the group consisting of aliphatic polyamines, aromatic polyamines, and mixtures thereof.

6. The process according to claim 1 wherein up to 50% by weight of the saturated polycarboxylic acid is replaced with a vegetable oil, selected from the group consisting of soya bean oil, linseed oil, cottonseed oil, tung oil, fish oil, perilla oil, oiticica oil, sunflower oil, safflower oil, walnut oil, dehydrated castor oil, monoglyceride of vegetable oil, and mixtures thereof.

7. The process according to claim 1 wherein up to 50% by weight of the polycarboxylic acid is replaced with a linear organic carbonate selected from the group consisting of p-xylene glycol bis(ethyl carbonate), diethylene glycol bis (allyl carbonate), and mixtures thereof.

8. The process according to claim 1 wherein up to 50% by weight of the organic polyhydroxyl compound and polycarboxyl acid is replaced with an organic compound containing hydroxyl and carboxyl radicals, selected from the group consisting of 10-hydroxy undecanoic acid, 2-hydroxy decanoic acid, $\omega$-hydroxy pentadecanoic acid, and mixtures thereof.

9. The process of claim 1 wherein the alkali catalyst is sodium silicate.

10. The product produced by the process of claim 1.

* * * * *